US006542261B1

United States Patent
McGraw

(12) 
(10) Patent No.: US 6,542,261 B1
(45) Date of Patent: Apr. 1, 2003

(54) METHOD AND APPARATUS FOR SENDING OR RECEIVING A SECURE FAX

(75) Inventor: Montgomery C. McGraw, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/290,504

(22) Filed: Apr. 12, 1999

(51) Int. Cl.[7] ................................................. H04N 1/00
(52) U.S. Cl. ........................ 358/434; 358/435; 358/436; 358/468; 280/243; 280/269
(58) Field of Search .................................. 358/434, 404, 358/441, 436, 468, 433, 1.15, 1.16; 713/201; 705/39; 380/243; 38/269

(56) References Cited

U.S. PATENT DOCUMENTS

| 5,159,630 A | * | 10/1992 | Tseng et al. |
| 5,398,283 A | * | 3/1995 | Virga |
| 5,450,493 A | * | 9/1995 | Maehr |
| 5,491,563 A | * | 2/1996 | Pomerantz |
| 5,583,941 A | * | 12/1996 | Yoshida et al. |
| 5,587,809 A | * | 12/1996 | Le Corre et al. ........... 358/405 |
| 5,633,932 A | * | 5/1997 | Davis et al. |
| 5,671,285 A | * | 9/1997 | Newman |
| 5,692,048 A | * | 11/1997 | Gormish et al. |
| 5,751,809 A | * | 5/1998 | Davis et al. |
| 5,914,788 A | * | 6/1999 | Tomida |
| 6,021,186 A | * | 2/2000 | Suzuki et al. |
| 6,065,120 A | * | 5/2000 | Laursen et al. ............. 713/201 |
| 6,073,118 A | * | 6/2000 | Gormish et al. |
| 6,195,177 B1 | * | 2/2001 | Marechal .................... 358/434 |
| 6,314,521 B1 | * | 11/2001 | Debry |
| 6,421,781 B1 | * | 7/2002 | Fox et al. .................... 713/201 |

FOREIGN PATENT DOCUMENTS

| EP | 0516451 A2 | * | 12/1992 | ............ H04N/1/32 |
| EP | 045574 A1 | * | 10/2000 | ............ H04N/1/44 |
| WO | WO98/47261 | * | 10/1998 | |

OTHER PUBLICATIONS

Facsimile with encrypted hard copy; R.A. Meyers et al.; IBM Technical Disclosure Bulletin; vol. 20 No. 11B, Apr. 1978 pp. 4994–4995.*

* cited by examiner

Primary Examiner—Edward Coles
Assistant Examiner—Tia A. Carter
(74) Attorney, Agent, or Firm—Conley Rose, P.C.

(57) ABSTRACT

A method and apparatus which sends an encrypted FAX document to a receiving party. The encrypted FAX is printed out by a receiving FAX with an unencrypted heading, indicating who the intended recipient of the received encrypted FAX is, and a body of the FAX in an encrypted format. Once the intended recipient receives the encrypted FAX document, the document can be scanned and decoded after the intended recipient provides a decode code. The decoded document can be printed by or viewed on a computer.

14 Claims, 5 Drawing Sheets

| ☑ Control Form | |
|---|---|
| ☐ FAX ☐ COPY ☐ SCAN ☑ SECURE FAX | ‖‖‖ ‖ |

| CONTRAST SETTINGS | LIGHT ☐ ☐—☐ ☐ ☐ DARK |
|---|---|

FAX SETTINGS

| FROM: | TO: |
|---|---|
| ⊷☑ Mark Pyeman | ☑ James Armstrong |
| ☐ Mac Morganfield | ☑ Fred King |
| ☐ Robert Johnson | ☑ Chester Burnett |
| | ☐ Charles Patton |
| | ☐ Alex Moore |

COVER SHEET
☑ YES

RESOLUTION
⊷☐ STANDARD
☐ FINE

Note  *A900 is easy to use!!*
- *Simple Faxing*
  - *Multiple Recipients*
  - *Cover Page Generation*
  - *Handwritten Notes*
- *Easy Copying*
  - *Black or Color in Draft/Normal/Best*
- *Scan Directly to application!!*

| COPY/SCAN TYPE | ☐ BLACK DRAFT | ☐ BLACK NORMAL | ☐ BLACK PHOTO | ☐ COLOR DRAFT | ⊷☐ COLOR NORMAL | ☐ COLOR BEST |
|---|---|---|---|---|---|---|

| COPY SETTING | QUANTITY | SCAN SETTING | DIRECTORY |
|---|---|---|---|
| SIZE | ⊷☐ 1  ☐ 2  ☐ 3 | | ⊷☐ Pagis Inbox |
| ⊷☐ 100% | ☐ 4  ☐ 5  ☐ 6 | | ☐ Shared |
| ☐ 95% LETTER TO A4 | ☐ 7  ☐ 8  ☐ 9 | | |
| ☐ 93% FIT TO PAGE | | | FILE FORMAT |
| ☐ 83% A4 TO LETTER | COLLATE | | ⊷☐ BMP File |
| ☐ 72% LEGAL TO LETTER | ⊷☐ YES | | ☐ JPG File |
| | ☐ NO | | ☐ TIFF File |

*FIG. 3*

SENDING A SECURE FAX
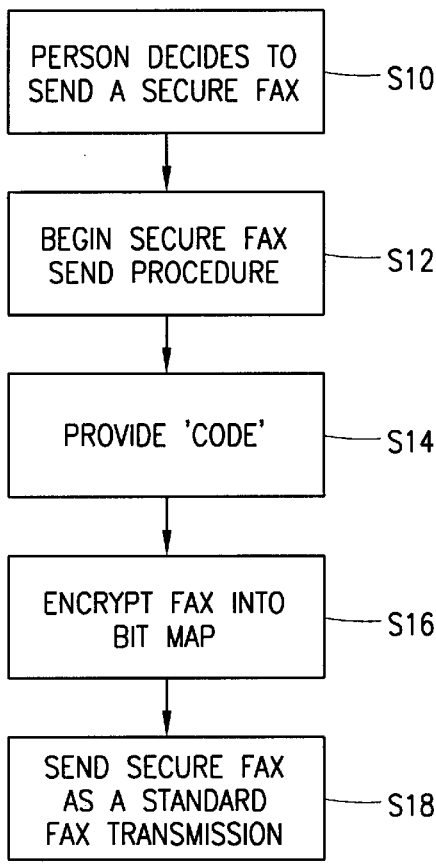
RECEIVING A SECURE FAX
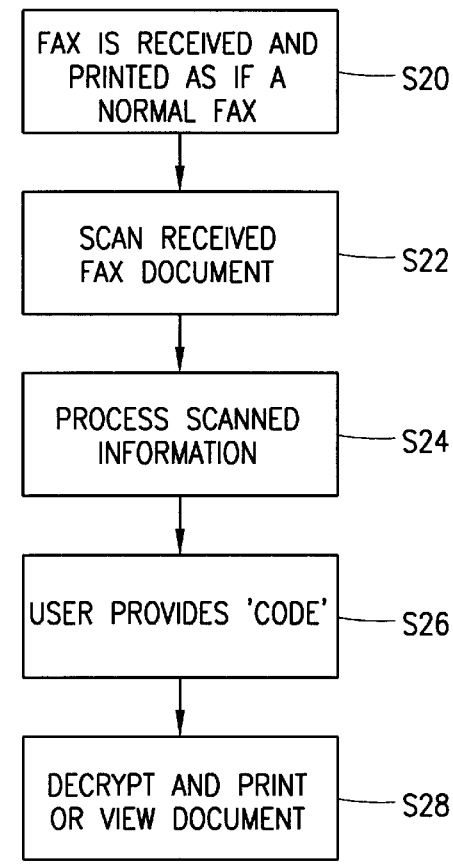
*FIG. 5*
*FIG. 6*

METHOD AND APPARATUS FOR SENDING OR RECEIVING A SECURE FAX

BACKGROUND OF THE INVENTION

1. Field of the Invention

The present invention relates to sending and receiving facsimile documents via a facsimile machine, and more particularly to sending and receiving secure facsimile documents via a facsimile machine such that the receiving party cannot directly read the received facsimile document.

2. Description of Related Art

At present, when a standard facsimile (FAX) machine is utilized to send important, sensitive information, such as financial, legal, personal or sensitive business data, the intended receiving party may not be the only party/person who views the received FAX document. In many cases a received FAX document may be handled and viewed by FAX room personnel, hotel personnel, or various corporate staff members prior to the received FAX arriving in the hands of the intended recipient. Thus, the important, sensitive information on the received FAX document may be seen or reviewed by parties who should not be viewing the document. Having sensitive information viewed by unintended viewers could result in a tremendous negative impact on an individual or corporation.

The drawback of the standard system for sending and receiving FAX documents is that the intended FAX recipient does not need to be present when the FAX document is received and printed or displayed.

One technique for solving the problem is for the sender and intended recipient of the FAX document to arrange a mutually convenient time for sending/receiving the FAX document so that the intended recipient can wait by the FAX machine for the document to be received and printed. This will insure that the intended recipient is the only viewer of the received FAX document. A drawback of this solution is that it can be inconvenient for both parties to set up a mutually acceptable time. It is further inconvenient for a traveling party who is receiving a FAX document at a hotel, client's business location, or, other location that is not in the control of the intended recipient.

What is needed is a method and/or apparatus for sending and receiving FAX documents in a manner that disables the ability of people, other than the intended recipient, from viewing the received FAX document.

SUMMARY OF THE INVENTION

It is an object of the present invention to provide a method and apparatus which allows a FAX document to be sent and received wherein the received FAX document cannot be interpreted by anyone casually glancing at it.

It is a further object of the present invention to provide a FAXing system and method that provides a hard copy of a secure FAX that is not legible to a human, but that can be decoded by an intended recipient of the same FAX.

It is a further object of the present invention to provide a method for encrypting the body of a FAXed document and to provide an unencrypted heading on the received FAX document. The encrypted heading informs a FAX operator who the encrypted FAX is for.

These and other objects, which will become apparent after reading the specification and studying the drawings, are accomplished by encrypting the body of a document using a code provided by the sending party. An unencrypted header is provided. The unencrypted header and the encrypted body of the FAX document are FAXed as a normal FAX via a system capable of transmitting a FAX document. When the FAXed document is received, it may be printed out as a normal FAX. The receiving party, who may not be the intended recipient of the FAXed document, will not be able to read the encrypted body of the received FAX document. The receiving party will be able to read the unencrypted header. Via the header, the received FAX can be delivered to the intended recipient.

The intended recipient can scan the received encrypted FAX into a computer and provide a decode code. The computer, via software will decrypt the encrypted body of the received FAX document with the decode code to produce a facsimile of the original document for the intended recipient.

BRIEF DESCRIPTION OF THE DRAWINGS

Various objects and advantages of this invention will become apparent and more readily appreciated from the following description of the presently preferred exemplary embodiments, taken in conjunction with the accompanying drawings, of which:

FIG. 3 depicts an exemplary control form that can be utilized in an embodiment of the present invention;

FIG. 5 depicts exemplary steps required to send a secure FAX document in accordance with the present invention; and FIG. 6 depicts exemplary steps required to receive and interpret a received secure FAX document in accordance with the present invention.

DETAILED DESCRIPTION OF EXEMPLARY EMBODIMENTS OF THE PRESENT INVENTION

An exemplary embodiment of the present secure FAX method and apparatus provides a means for protecting the information on a received hard copy FAX. In general, the sender of the FAX enters a "code" into either a FAX machine's control panel or an associated computer which is running a secure FAX software package. The code is known by the intended recipient of the FAX (or at least his secure FAX software). The document to be sent via secure FAX in accordance with the present invention is scanned by the sender's FAX machine or other scanning device. The scanned data is encrypted via one of a variety of known encryption techniques. The code provided by the sender could be utilized in the secure FAX encryption process.

A non-encrypted FAX header information is created by either the sending secure FAX machine or the sending computer. The secure FAX header preferably will indicate to the actual receiver of the FAX that the information following the header is a secure FAX. The header will also indicate, at least, who is the intended recipient of the received secure FAX.

The FAX encryption process, along with the header information, are combined to produce a secure FAX data stream in standard FAX data format. The secure FAX data stream is sent over standard telephone line (like a normal FAX) or could be sent via the internet as a FAX document. The secure FAX data stream is received by a receiving FAX machine (or a reasonable facsimile) and printed or viewed in a normal manner. The printed or viewed received FAX will have the unencrypted header at the top of the page so that the receiving party (who may not be the intended recipient) will know to whom the received secure FAX document should be given to. For example a hotel's business center would need to know which guest the secure FAX should be delivered to.

Below the header information is the encrypted portion of the received FAX. The encrypted portion is unreadable by a human so that the, for example, hotel personnel, cannot read the contents of the secure FAX. The encrypted portion of the document may include black and white dots, bars, squares or other indicia that appear to be randomly spaced or placed on the encrypted data areas of the received FAX document.

When the intended recipient of the secure FAX receives the encrypted FAX document, he or she may process it by using a multifunction FAX/printer or scanner combined with a personal computer. The encrypted document is then read or scanned. The intended recipient must provide a decode code. The dots, bars, or squares are decoded into the original source text or graphics and either printed out or displayed by the computer. Note that the process does not necessarily require the received FAX to be printed because the received FAX could have been stored on the computers hard drive or on another memory storage medium such as a floppy disk or flash memory card.

Figure 1:
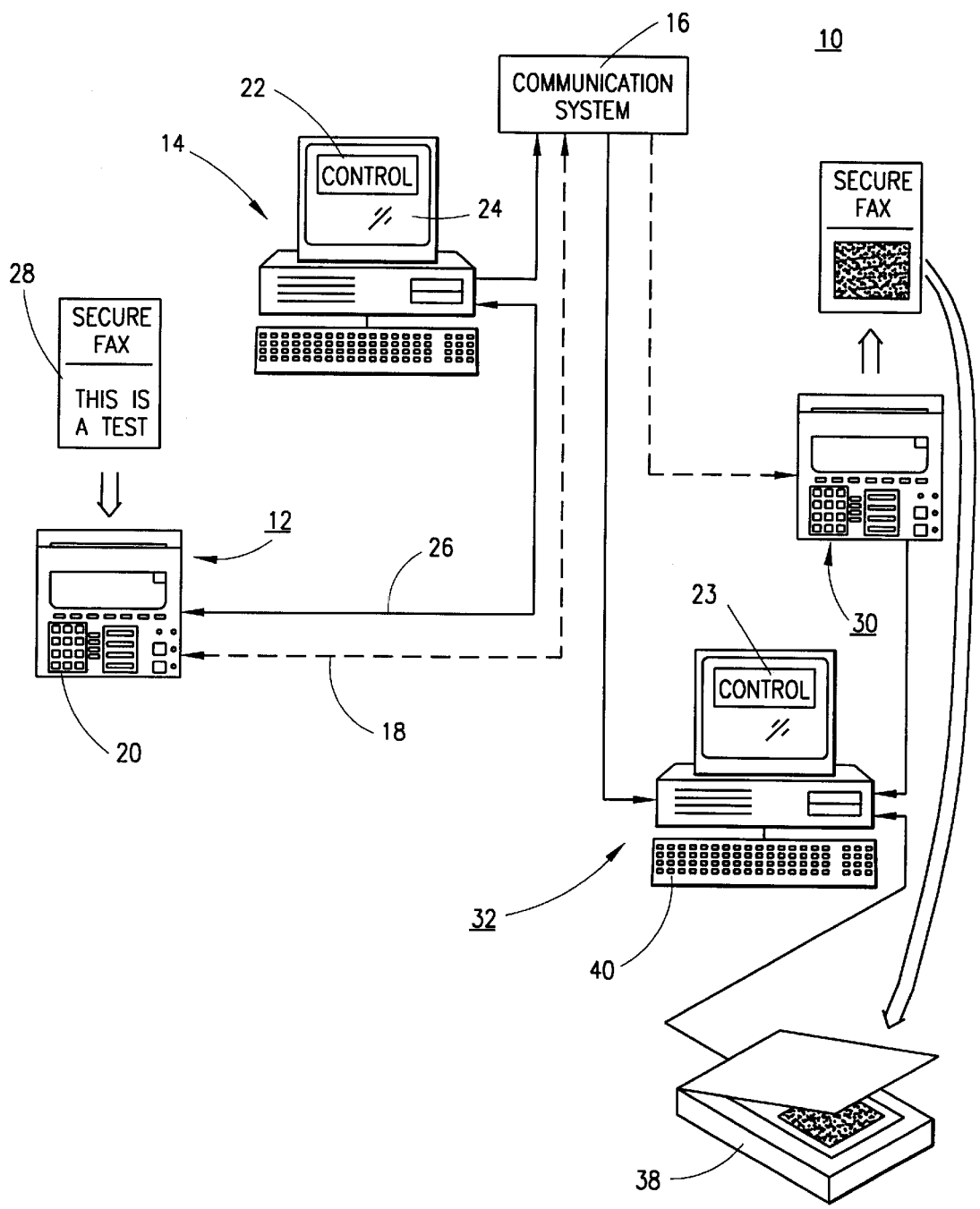
FIG. 1 depicts an exemplary embodiment and configuration for sending and receiving a secure FAX document in accordance with the present invention.

Referring now to FIG. 1, an exemplary embodiment of a system 10 for processing a secure FAX transmission, receipt and decode is shown. Here a multifunctional printer/FAX machine 12 is connected to a personal computer (PC) 14. The exemplary multifunction printer/FAX could be either a stand-alone multifunction printer/FAX with encryption software installed therein and directly connected to a communication system 16, such as telephone system or internet communication system via connection 18. The multifunction printer/FAX machine 12 could also be peripheral to a personal computer 14. Control of the multifunction printer/FAX machine may be handled by a user either at a control panel 20 on the multifunction printer/FAX or a control panel 22 which operates as a window on the screen of a monitor associated with the PC 14.

The PC 14 contains secure FAX software (not specifically shown) which will request a code from the user and encrypt data received over the printer/FAX connection 26. The user essentially has the document 28 scanned by the multifunction printer/FAX machine 12 and enters a code in response to a software request. The document to be sent 28 is encoded using the code provided by the user and then turned into a standard FAX bit mapping. An unencoded header containing, at least, information describing who the intended recipient of the FAX document and who the FAX document is from, along with other pertinent information is included. The secure FAX data (secure bit map and header) is sent as a normal FAX to a communication system 16. The communication system can be a standard phone system, internet system or any communication system that can or is adopted to carry a FAX transmission.

Figure 4:
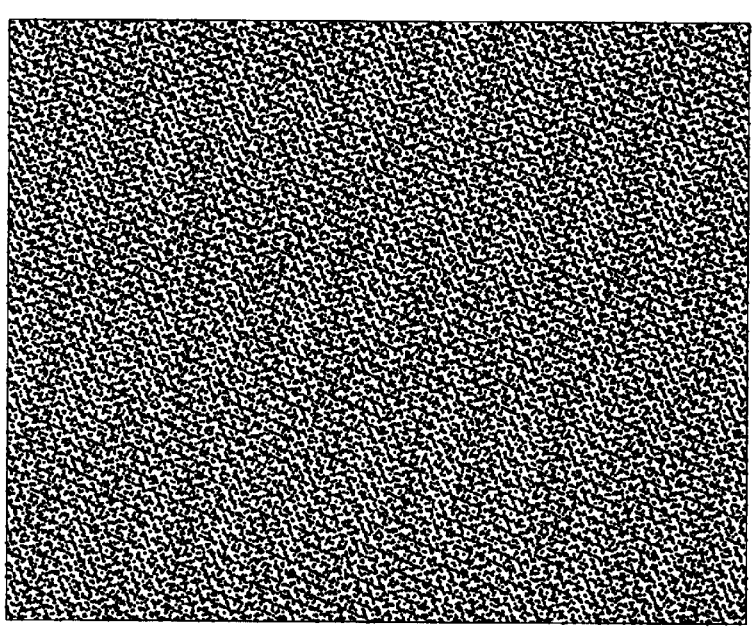
FIG. 4 depicts an exemplary secure received FAX document.

The secure FAX data is received by either a standard FAX machine 30 or another computer (personal computer) 32. If the secure FAX data is received by a standard FAX machine, it is printed out like a standard FAX. An exemplary secure FAX printout 34 is shown in FIG. 4. The header indicates who the secure FAX is from and who the intended recipient(s) is. The date and time may be included along with an unencrypted note from the sender. The encrypted portion of the FAX is unreadable by a human and may take the form of black and white dots, blocks or bars. Also there may be alignment indicators 36 which are used to remove rotation errors when the secure FAX document 34 is being scanned for processing.

Referring back to FIG. 1, the secure FAX document 34 may then be delivered to the intended recipient. The intended recipient will then scan the secure FAX document on a scanner 38. The scanner 38 can be any equipment or computer peripheral that can scan a document and provide data to a computer 32 to turn it into a graphics documents such as .pdf, .gif, .jpg, .bmp, .tga, .pcx, .ppm, .pgm, .tif or other common graphics document type. The graphics document may be utilized by the computer 32 and a secure FAX program or driver located on the hard drive, RAM or other memory storage device on the computer 32. The secure FAX driver asks the user via a control panel 23 on the scanning device (or via guided user instructions GUI if a PC application is controlling the decoding) for a decryption code. The intended recipient enters the decryption code via, for example, the computer keyboard. The secure FAX driver then reads the graphics document data and/or the scanners bit stream. Using the decryption code and the alignments markings 36 on the secure FAX document 34, the encrypted portion of the secure FAX document is decrypted into the originally sent document 28. The decryption process uses a known decryption techniques such as RSA, PDP, PGP, DES, or other encryption/decryption techniques.

The resulting decrypted original document can be displayed on the screen associated with the computer 32 or can be printed out on a printer or the multifunctional printer/FAX machine 30 associated with the decryption computer 32.

It is understood that the received secure FAX document could have been received by a FAX card or circuitry within the computer 32. The computer user may be informed that a FAX has been received. The user could preview or view the received secure FAX on the computer screen in its encrypted format. If the user knows the code to decrypt the received secure FAX, then it can be entered into the computer so that the dots, bars or boxes in the encrypted portion of the received secure FAX can be read by secure FAX driver and decrypted. The decrypted FAX, which looks like the original document 28, can then be either displayed on the screen or printed for the user.

Figure 2:
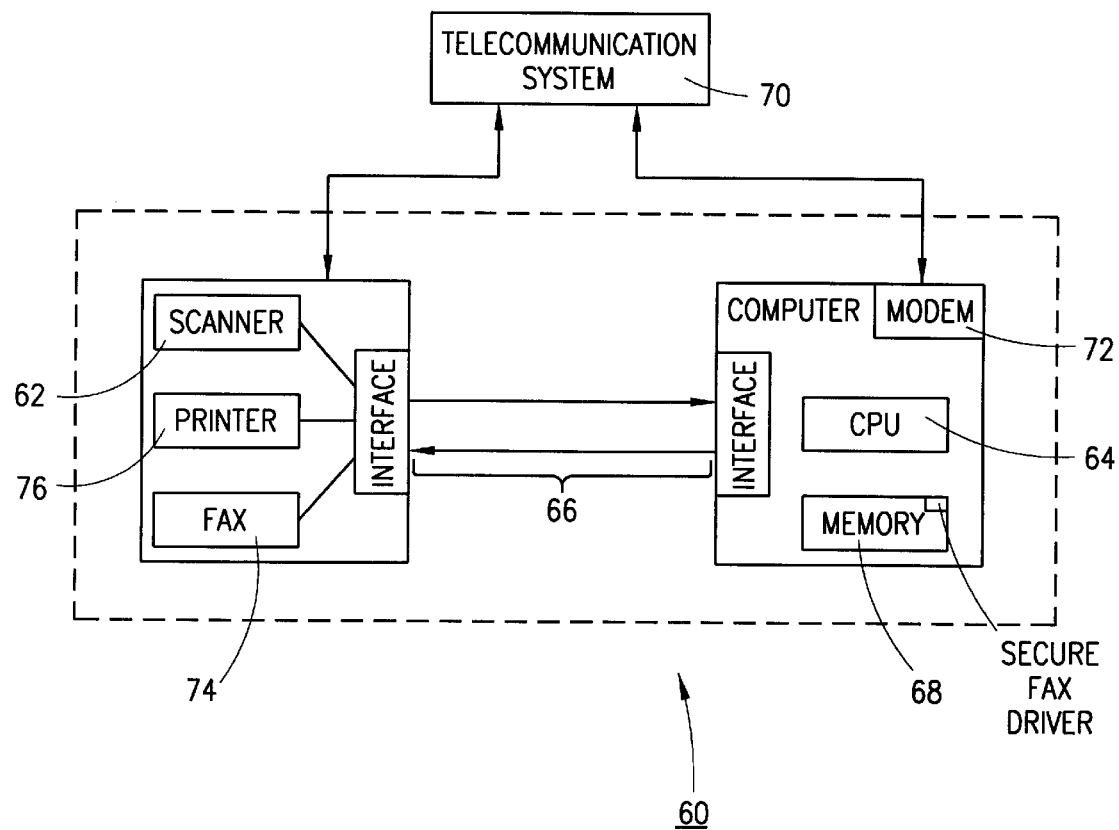
FIG. 2 depicts an exemplary block diagram of a configuration and apparatus for sending and receiving a secure FAX document in accordance with the present invention.

FIG. 2 depicts a block diagram of an exemplary apparatus 60 for sending or receiving a secure FAX in accordance with the present invention. To send a secure FAX in accordance with the present invention a device that can scan the document to be securely FAXed such as a scanner is needed. The scanner 62 must be able to interface with a central processing unit (CPU) 64. The interface 66 may be any one of a plurality of interface buses including a parallel or serial style bus. The CPU 64 must be associated with a memory circuit and/or data storage mechanism (such as RAM, flash memory, hard drive, floppy drive or other memory circuitry). The memory circuitry will store the scanned document and allow the CPU 64 to encrypt and manipulate the data into the encrypted portion of the secure FAX document.

The CPU 64, memory 68 and scanner 62 may all be contained in a multifunction printer/scanner/FAX machine. Such a printer/scanner/FAX machine would accept a "code" from a user via a control panel, then create a "plain text"

header "To and From" information at the top of the secure FAX. The printer/scanner/FAX may connect directly to a telecommunication system 70 such that FAX circuitry 74 sends the secure FAX directly to the telecommunication system 70.

On the other hand, the CPU 64 and memory 68 may be integral circuits within a personal computer and the scanner 62 may be part of a peripheral device that interfaces with the personal computer. The scanned document may be sent to the personal computer via the interfaces 66. The personal computer uses a secure FAX driver 67 stored in memory to operate on the scanned document data to produce the secure FAX document. The secure FAX document is then sent via a modem 72 to the telecommunication system 70 and then ultimately to the intended recipient.

Still referring to FIG. 2, to receive a secure FAX in accordance with the present invention the telecommunication system 70 will deliver the secure FAX document in the form of FAX data to the FAX circuitry 74. The FAX circuitry 74 receives the secure FAX document data and prints it out via the printer 76. At the option of the user, the FAX circuitry 74 could send the received secure FAX data, via the interface 66, to the memory 68 for storage until the receiving party requests that the received FAX be printed or viewed.

If the received FAX is printed it will look something like that which is depicted in FIG. 4. The printed secure FAX will have an indicia 78 indicating it is a secure FAX. It will also have an unencrypted header which will, at least, indicate who the intended recipient of the secure FAX is. Another portion will contain encrypted data in the form of black and white lines, bars, dots, squares that can be read by the encryption decoder driver. The secure FAX will also comprise alignment indicators to aid the decryption drivers to remove or compensate for rotation or skew in the scanned secure FAX.

The received and printed secure FAX is then provided to the intended recipient. The intended recipient must rescan the document in a scanner 62 so that the data is provided to a CPU 64 and memory 68. Once stored in memory the intended recipient will be queried for the decode code by the CPU 64. The CPU and secure FAX decode driver/program utilizes the decode code to decrypt the stored secure FAX and then print out a copy of the original document that was sent via the printer 76.

The main utilitarian aspect of the present invention is that only the intended recipient can decode the secure FAX document. None of the people who handle the received FAX are able to understand the information contained in the secure FAX. Only the intended recipient can decode it because he/she will now the decode code.

FIG. 3 depicts a FAX control form that can be used to create a cover page or header for a secure FAX. A user may have the depicted control form scanned by a scanner. The software will read the scanned document and detect which boxes are checked. In FIG. 3, the secure FAX box is checked and can be scanned by the scanner and interpreted by the secure FAX software. Furthermore, the person the FAX is from and the people who are the intended recipients are also checked.

The note portion of the control form will also be scanned. As a result the received secure FAX will have a header with to "to and from" information along with the note portion in an unencrypted format.

FIG. 4 depicts an exemplary received secure FAX that has been printed by a standard FAX machine. An indicia 78 is shown and is read by the scanner and the associated secure FAX software. The indicia 78 may be used to indicate that the document is in a secure FAX format. As described above, an unencrypted header is printed. The unencrypted header may include who the secure FAX is from, who the intended recipients are and the note portion (note shown). Below the unencrypted header is the encrypted portion of the secure FAX. FIG. 4 depicts the encrypted portion to be a plurality of black and white squares. The black and white squares represent an encrypted data stream. Error protection and redundant data may be incorporated into the encrypted data portion of the secure FAX document.

Alignment markings 36 are found on the secure FAX document 34 to enable the secure FAX software to interpret, among other things, the beginning and end of the secure data portion, and provide skew and rotation correction information so that the encrypted information can be read correctly.

FIG. 5 depicts exemplary steps required to send a secure FAX in accordance with the present invention. In step S10 a person decides they want to send a secure FAX to an intended recipient. The sending party first decides what documents are going to be FAXed. They must decide who the document is going to be FAXed to. If they are going to use the control form depicted in FIG. 3 they will fill out the check marks in the control form. If they are not going to use the control form they may call up the secure FAX software in their computer and input the necessary destination data.

In step S12, the user indicates that this is a secure FAX. The secure FAX software/drivers create the unencrypted header and request a "code" in step S14 to use in the encryption technique. In step S16, the body of the original document is then encrypted into an encrypted bit map which is an encrypted representation of the body of the original document.

The bit map and the unencrypted header are combined into a standard style FAX document and transmitted via a communication system as a normal FAX in step S18.

FIG. 6 depicts exemplary steps required to receive and read a secure FAX document. In step S20 a FAX machine or a device that can receive a FAX document receives and prints the received secure FAX document as if it was a normal FAX. The FAX operator realizes that the document is a secure FAX (because he can't read the content), but can read the unencrypted portion of the received FAX. The unencrypted header tells the FAX operator who the intended recipient of the document is.

The received secure FAX is then provided to the intended recipient. In step S22, the intended recipient scans the secure FAX document in a scanning device connected to a computer.

In step S24, the scanned document is read, adjusted for skew and rotation, and turned into a bit map/bit stream representing an encrypted form of the original document. In step S26, the user is queried for the code (decryption code) that must be used to decrypt the encrypted bit map/bit stream into a human readable document.

In step S28, the secure FAX software/drivers decrypt the encrypted FAX bit map/bit stream and either print out the human readable document or display the same on a computer screen. The human readable document is a reasonable facsimile of the original document that was sent by the sending party.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for communicating a secure FAX document to an intended recipient, said method comprising the steps of:
   providing destination information and a document to be faxed to a sending facsimile system;
   providing a code to said sending facsimile system;
   encrypting said document to be FAXED into an encrypted FAX document, wherein said encrypting further comprises incorporating error protection and redundant data into the document data;
   faxing a header containing destination information and said encrypted FAX document as a secure FAX document;
   receiving said secure FAX document at a destination facsimile system;
   reading said header to determine the intended recipient but, not being able to read said encrypted FAX document portion of the received secure FAX document;
   providing said secure FAX document to an intended recipient;
   providing said code by said intended recipient to a decryption system;
   decrypting said encrypted FAX using said code; and
   providing a facsimile of said document to be FAXED to said intended recipient.

2. The method for communicating a secure FAX to an intended recipient of claim 1, wherein said sending facsimile system comprises a printer/scanner/FAX machine that incorporates a secure FAX driver.

3. The method for communicating a secure FAX to an intended recipient of claim 1, wherein said sending facsimile system is a scanner peripheral device connected to a computer wherein said computer comprises a secure FAX application and FAX modem circuitry.

4. The method for communicating a secure FAX to an intended recipient of claim 1, wherein said step of receiving said secure FAX document at destination facsimile system further includes printing said secure FAX document as a printed secure FAX document.

5. The method for communicating a secure FAX to an intended recipient of claim 4, wherein said step of providing said secure FAX document to an intended recipient comprises providing said printed secure FAX document to said intended recipient.

6. A system for providing a FAX document to an intended recipient in a secure manner comprising:
   an origination FAX system for scanning a document, wherein scanning further includes scanning an unencrypted header portion to determine if a box has been checked indicating a secure FAX, encrypting said document using a user provided code, and sending said document in an encrypted format along with the unencrypted heading, said combination of said unencrypted heading and said document in an encrypted format being a secure FAX document;
   a destination FAX system for receiving and printing said secure FAX document, such that said unencrypted heading is legible to a human and said document in said encrypted format is substantially illegible to a human;
   a decoding system for reading the printed secure FAX document and for decoding said document in said encrypted format after being provided a code from an intended recipient, said decoding system further providing a facsimile copy of said document to said intended recipient.

7. The system for providing a FAX document to an intended recipient of claim 6, wherein said origination FAX system comprises a FAX machine that utilizes a secure FAX driver.

8. The system for providing a FAX document to an intended recipient of claim 6, wherein said origination FAX system comprises:
   a scanner;
   a control panel for entering said code; and
   a central processing circuitry for encoding said document.

9. The system for providing a FAX document to an intended recipient of claim 6, wherein said destination FAX system and said decoding system are part of a personal computer system.

10. The system for providing a FAX document to an intended recipient of claim 6, wherein said decoding system comprises a personal computer connected to a peripheral scanning device.

11. A method for sending a secure FAX, said method comprising the steps of:
    providing destination information and a document to be faxed to a sending facsimile system;
    providing a code to said sending facsimile system;
    encrypting said document to be FAXED into an encrypted FAX document; and
    faxing a header containing destination information and said encrypted FAX document as a secure FAX document;
    wherein said step of faxing further includes scanning said header portion to determine if a box has been checked indicating a secure FAX.

12. A method for sending a secure FAX, said method comprising the steps of:
    providing destination information and a document to be faxed to a sending facsimile system;
    providing a code to said sending facsimile system;
    encrypting said document to be FAXED into an encrypted FAX document; and
    faxing a header containing destination information and said encrypted FAX document as a secure FAX document;
    wherein said encrypting step further comprises incorporating error protection and redundant data into the document data.

13. A method for communicating a secure FAX document to an intended recipient, said method comprising the steps of:
    providing destination information and a document to be faxed to a sending facsimile system;
    providing a code to said sending facsimile system;
    encrypting said document to be FAXED into an encrypted FAX document;
    faxing a header containing destination information and said encrypted FAX document as a secure FAX document, wherein said faxing further includes scanning said header portion to determine if a box has been checked indicating a secure FAX;
    receiving said secure FAX document at a destination facsimile system;
    reading said header to determine the intended recipient but, not being able to read said encrypted FAX document portion of the received secure FAX document;

providing said secure FAX document to an intended recipient;

providing said code by said intended recipient to a decryption system;

decrypting said encrypted FAX using said code; and providing a facsimile of said document to be FAXED to said intended recipient.

14. A system for providing a FAX document to an intended recipient in a secure manner comprising:

an origination FAX system for scanning a document, encrypting said document using a user provided code, wherein said encrypting further comprises incorporating error protection and redundant data into the document data, and sending said document in an encrypted format along with an unencrypted heading, said combination of said unencrypted heading and said document in an encrypted format being a secure FAX document;

a destination FAX system for receiving and printing said secure FAX document, such that said unencrypted heading is legible to a human and said document in said encrypted format is substantially illegible to a human;

a decoding system for reading the printed secure FAX document and for decoding said document in said encrypted format after being provided a code from an intended recipient, said decoding system further providing a facsimile copy of said document to said intended recipient.

* * * * *